(12) United States Patent
Volchko

(10) Patent No.: US 7,981,182 B2
(45) Date of Patent: Jul. 19, 2011

(54) LABYRINTH BOX STRUCTURE AND METHOD

(75) Inventor: Scott Jeffrey Volchko, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 51 days.

(21) Appl. No.: 12/340,637

(22) Filed: Dec. 19, 2008

(65) Prior Publication Data
US 2009/0166286 A1 Jul. 2, 2009

Related U.S. Application Data

(60) Provisional application No. 61/017,951, filed on Dec. 31, 2007.

(51) Int. Cl.
*B01D 45/08* (2006.01)

(52) U.S. Cl. .......... 55/462; 55/385.3; 55/385.4; 55/465; 55/444; 55/445; 55/446; 55/337; 55/343; 55/345; 55/346; 55/442; 55/DIG. 14; 55/DIG. 19; 95/272; 95/267; 96/385; 96/386; 210/320; 210/336; 210/532.1; 210/801; 210/90

(58) Field of Classification Search .................. 96/385, 96/386; 95/272, 267; 55/385.3, 385.4, 462, 55/465, 444, 445, 446, 442, DIG. 14, DIG. 19
See application file for complete search history.

(56) References Cited

U.S. PATENT DOCUMENTS

| | | | | |
|---|---|---|---|---|
| 3,250,263 A | * | 5/1966 | Gerjets | 123/573 |
| 3,276,202 A | * | 10/1966 | Wright | 60/274 |
| 3,524,437 A | * | 8/1970 | Crandall | 123/573 |
| 5,556,441 A | * | 9/1996 | Courtwright et al. | 55/502 |
| 5,579,739 A | * | 12/1996 | Tuckey et al. | 123/467 |
| 5,912,368 A | * | 6/1999 | Satarino et al. | 55/320 |
| 6,475,382 B2 | * | 11/2002 | Parent | 210/198.1 |
| 6,500,338 B2 | * | 12/2002 | Baah | 210/266 |
| 7,381,234 B2 | * | 6/2008 | Oh | 55/318 |
| 7,462,212 B2 | * | 12/2008 | Han et al. | 55/343 |
| 2006/0230717 A1 | * | 10/2006 | Oh et al. | 55/343 |
| 2008/0223010 A1 | * | 9/2008 | Han et al. | 55/345 |

OTHER PUBLICATIONS

Machine Translation of JP 5272372.*

* cited by examiner

*Primary Examiner* — Jason M Greene
*Assistant Examiner* — Dung Bui
(74) *Attorney, Agent, or Firm* — Kenealy Vaidya LLP; Mark E. Duell

(57) ABSTRACT

A labyrinth box can include a housing that has an open end, a closed end, and defines two cavities. A cover is configured to cover the opening and can include a divider that extends into one of the two cavities of the housing to define first and second chamber passageways in that cavity. An inlet port is located in the bottom closed end of one of the cavities and an outlet port is located in the other of the cavities. The surfaces that define the chambers can be configured such that the box can be oriented in different positions and still work, namely, in horizontal and vertical positions. When in the vertical position, the divider can include surfaces that are angled off of the horizontal plane and towards the inlet port such that water and debris will return to the inlet port via gravity. The labyrinth box can be used in applications that require separation between fluids and/or debris, such as in a fuel tank pressure sensor system in which rainwater, backsplash, or other debris, should be kept clear from a pressure sensor that has a portion exposed to atmospheric pressure for sensor reference purposes.

21 Claims, 7 Drawing Sheets

LABYRINTH BOX STRUCTURE AND METHOD

BACKGROUND

This application claims the priority benefit under 35 U.S.C. §119 of U.S. Provisional Patent Application No. 61/017,951 filed on Dec. 31, 2007, which is hereby incorporated in its entirety by reference.

1. Field

The presently disclosed subject matter relates to a labyrinth box structure that can prevent unwanted substance(s) from intruding into a hose or conduit, in particular, a port leading to a pressure sensor for a vehicle fuel system, breathers for differentials, etc.

2. Description of the Related Art

Existing vehicle fuel systems can employ a tank pressure sensor to monitor the vapor pressure in the fuel tank. Typically, the tank pressure sensor is exposed to the atmosphere via a port to provide the sensor with a pressure reference. The vehicle may pass through debris and fluid that can enter the port and adversely affect the pressure sensor. Conventionally, small joints or complex box arrangements are employed to protect the port leading to the tank pressure sensor from unwanted debris and fluid. Typically, these small joints or boxes are mounted underneath the body of the vehicle, where exposure to unwanted debris and fluid can be excessive.

One example of a conventional small joint arrangement is illustrated in FIGS. 5A and B. This small joint arrangement can include a joint that has a ninety degree bend with the opening pointing down toward the surface upon which the vehicle is travelling. The joint can be made of plastic and mates into a stay or a frame member.

FIGS. 6A-C illustrate a conventional complex box arrangement. Typically, this design is mounted under the floor of the vehicle and can protect the port that is in fluid communication with the tank pressure sensor from water splashed up by the vehicle.

When driving along paved roads, either of these conventional arrangements offer sufficient protection to the tank pressure sensor from unwanted debris and fluids. However, because these structures are usually mounted underneath the vehicle body, they may not provide sufficient protection to the tank pressure sensor from unwanted debris and fluid when driving off-road and/or through deep water and/or snow, etc.

SUMMARY

According to one aspect of the disclosure, a labyrinth box can include a single unitary piece housing structure having an open end spaced from a substantially closed end by at least one side wall, the housing structure defining a first cavity having a first longitudinal length extending from the substantially closed end to the open end of the housing structure and a second cavity having a depth extending substantially parallel with the longitudinal length of the first cavity and from the substantially closed end to the open end of the housing structure, the housing structure having an inlet port located at the substantially closed end of the first cavity and an outlet port located in the second cavity. The box can also include a cover located adjacent and sealing the open end of the housing structure, the cover including an inner surface facing the housing structure, the cover further including a divider extending from the inner surface of the cover into the first cavity of the housing structure to divide the first cavity into a first chamber and a second chamber, the divider extending along a substantial portion of the longitudinal length of the first cavity such that a longitudinal axis of the first chamber and a longitudinal axis of the second chamber are each substantially parallel with the longitudinal axis of the first cavity. The housing structure can be configured such that the second cavity forms a third chamber that is in fluid communication with the second chamber at a location opposed to the inlet port and closer to the cover than the inlet port.

According to another aspect of the disclosed subject matter, the labyrinth box can include a housing structure and cover that are configured such that the first chamber forms a dead end closure adjacent the cover and is open to the inlet port at a location opposed to the dead end closure.

According to another aspect of the disclosed subject matter, the labyrinth box can include an outlet port located in the closed end of the housing structure. The outlet port can also include a tubular structure extending from the closed end of the housing structure.

According to another aspect of the disclosed subject matter, the cover inner surface can extend substantially perpendicular to the divider, and the closed end of the housing structure that defines the first cavity includes a bottom surface portion that extends substantially parallel with the cover inner surface, the bottom surface portion that extends substantially parallel also terminates at a location defining an inner perimeter of the inlet port.

According to another aspect of the disclosed subject matter, the housing structure can include a side wall that includes a first cavity side surface located adjacent to the bottom surface portion, the first cavity side surface extending substantially perpendicular to the cover inner surface and combining with the bottom surface portion to define the inner perimeter of the inlet port. The divider extending from the inner surface of the cover into the first cavity can include at least one surface that is positioned at an angle with respect to the longitudinal axis of the first chamber such that when the box is oriented in a configuration in which the cover extends vertically and the longitudinal axis of the first chamber extends horizontally, fluid will drain off of the divider due to the action of gravity and the angle of the divider surface.

According to another aspect of the disclosed subject matter, the inlet port can be exposed to atmospheric pressure and the outlet port configured for attachment to a fuel tank pressure sensor structure.

According to another aspect of the disclosed subject matter, the labyrinth box can include an inlet port, an outlet port, a plurality of first surfaces located adjacent the inlet port and defining a first chamber that extends along a first chamber longitudinal axis from a first chamber primary end located adjacent the inlet port to a first chamber distal end spaced from the inlet port and sealed by an end surface to form a dead end, a plurality of second surfaces located adjacent the inlet port and defining a second chamber that extends along a second chamber longitudinal axis from a second chamber primary end located adjacent the inlet port to a second chamber distal end spaced from the inlet port and in fluid communication with a third chamber, a plurality of third surfaces located adjacent the plurality of second surfaces and defining the third chamber, the third chamber located adjacent at least a portion of the second chamber and the outlet port defined by at least one of the plurality of third surfaces in the third chamber, the plurality of second surfaces and the plurality of third surfaces being configured such that fluid that enters the outlet port via the third chamber and second chamber must turn at least 90 degrees with respect to the longitudinal axis of the second chamber during travel from the second chamber primary end to the outlet port.

The plurality of first surfaces and the plurality of second surfaces can share a common wall divider structure that extends from the first chamber distal end and the second chamber distal end towards the inlet port along a substantial length of the first chamber and second chamber. The divider structure can include at least one surface that is positioned at an angle with respect to the first chamber longitudinal axis and toward the inlet port such that when the box is oriented in a configuration in which the first chamber longitudinal axis is horizontally oriented, fluid will drain off of the divider structure due to the action of gravity and the angle of the divider structure surface.

According to another aspect of the disclosed subject matter, the plurality of second surfaces and the plurality of third surfaces can share a common division wall. The divider and the division wall can extend substantially parallel with each other.

According to another aspect of the disclosed subject matter, the plurality of second surfaces and the plurality of third surfaces can share a common division wall such that a first surface of the division wall forms one of the plurality of second surfaces that define the second chamber and a second surface of the division wall is substantially opposed to the first surface of the division wall and forms one of the plurality of third surfaces that define the third chamber, the first surface of the division wall extending substantially parallel with the second surface of the division wall.

According to another aspect of the disclosed subject matter, the plurality of third surfaces can form a third chamber inlet located adjacent the second chamber distal end, and the outlet port can be located in the third chamber at a position opposed to the third chamber inlet such that fluid must turn at least ninety degrees as it passes from the second chamber primary end via the second chamber distal end and third chamber inlet to the outlet port.

According to another aspect of the disclosed subject matter, the divider structure can include a longitudinal central axis and the plurality of second surfaces that define the second chamber can include a second inlet defining surface that is oriented substantially perpendicular to the longitudinal central axis of the divider structure. The longitudinal central axis of the divider structure can be configured to intersect the second inlet defining surface and the second inlet defining surface can be configured to define an inner perimeter of the inlet port.

According to another aspect of the disclosed subject matter, the labyrinth box can include a first housing member including a plurality of first inner surfaces extending along different planes, the first inner surfaces defining a cavity and an opening extending across a portion of the cavity. A second housing member can have a plurality of second inner surfaces extending along different planes, one of the second inner surfaces extending across the opening of the first housing member to close the opening, the second surfaces cooperating with the first surfaces to define a circuitous passageway. An inlet can be located at a first position in the circuitous passageway, and an outlet can be located at a second position in the passageway. The passageway can include at least one dead end branch that extends from the inlet and terminates at a location spaced from the inlet such that fluid cannot pass through the dead end branch, and the passageway can also include a throughway branch that extends from the inlet to the outlet. The throughway branch can be circuitous and configured such that fluid can pass through the throughway branch via the inlet and outlet.

According to another aspect of the disclosed subject matter, the inlet can be exposed to atmospheric pressure and the outlet can be configured for connection to a fuel tank pressure sensor structure.

According to another aspect of the disclosed subject matter, the second housing member can include a cover portion and a divider structure extending along a divider longitudinal axis substantially perpendicularly from the cover portion. The divider structure can extend into the cavity of the first housing member to define two adjacent passageway portions on either side of the divider structure. A first of the adjacent passageway portions can be the dead end branch.

According to another aspect of the disclosed subject matter, the first inner surfaces of the first housing member can include a bottom surface portion extending substantially perpendicular to the divider longitudinal axis and intersecting with the divider longitudinal axis while being spaced from the divider structure, the bottom surface portion terminates at a location to define an inner perimeter of the inlet.

According to another aspect of the disclosed subject matter, the first housing member can include a mounting member wall that extends from the first housing member in a substantially perpendicular manner with respect to a longitudinal axis of the dead end branch of the circuitous passageway. An outside surface of the mounting member wall can be configured to intersect with at least one of the plurality of first inner surface walls to form a portion of an inner perimeter of the inlet.

BRIEF DESCRIPTION OF THE DRAWINGS

The disclosed subject matter of the present application will now be described in more detail with reference to exemplary embodiments of the apparatus, given by way of example, and with reference to the accompanying drawings, in which.

DETAILED DESCRIPTION OF EXEMPLARY EMBODIMENTS

Figure 1:
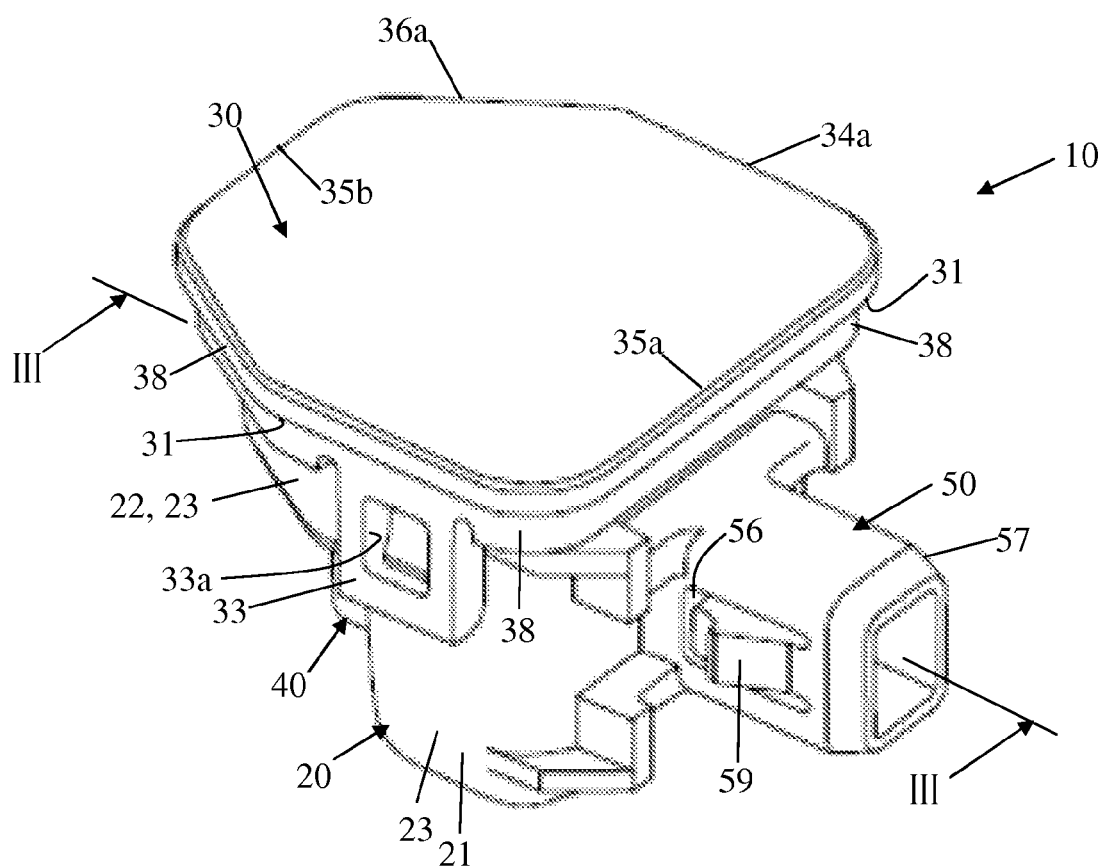
FIG. 1 is a perspective view of a labyrinth box in accordance with the disclosed subject matter.
Figure 2:
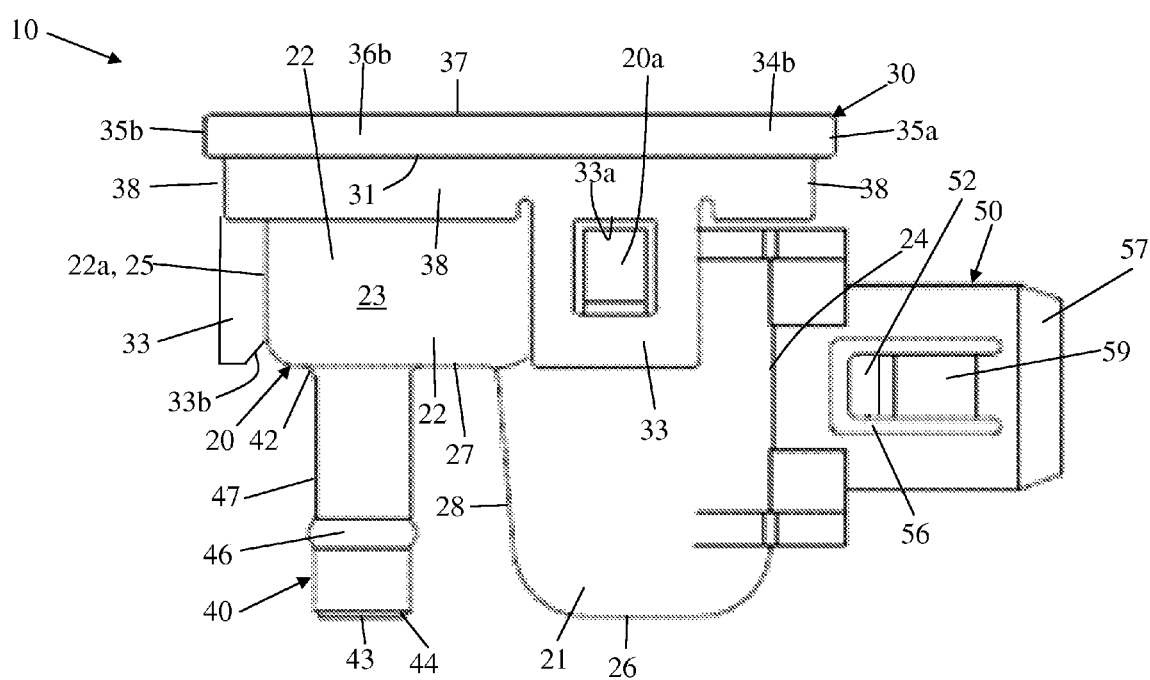
FIG. 2 is a side view of the labyrinth box of FIG. 1.

FIGS. 1 and 2 illustrate an embodiment of a labyrinth box 10 made in accordance with the principles of the disclosed subject matter. The labyrinth box 10 can include a housing 20, a cover 30 extending over the housing 20, a port 40 (FIG. 2) for connection to a conduit (not shown) that leads to a component whose accessibility to certain substance(s) is desired and whose accessibility by other substance(s) is unwanted, and a mounting member 50 for securing the labyrinth box 10 to a support structure (not shown).

Figure 3:
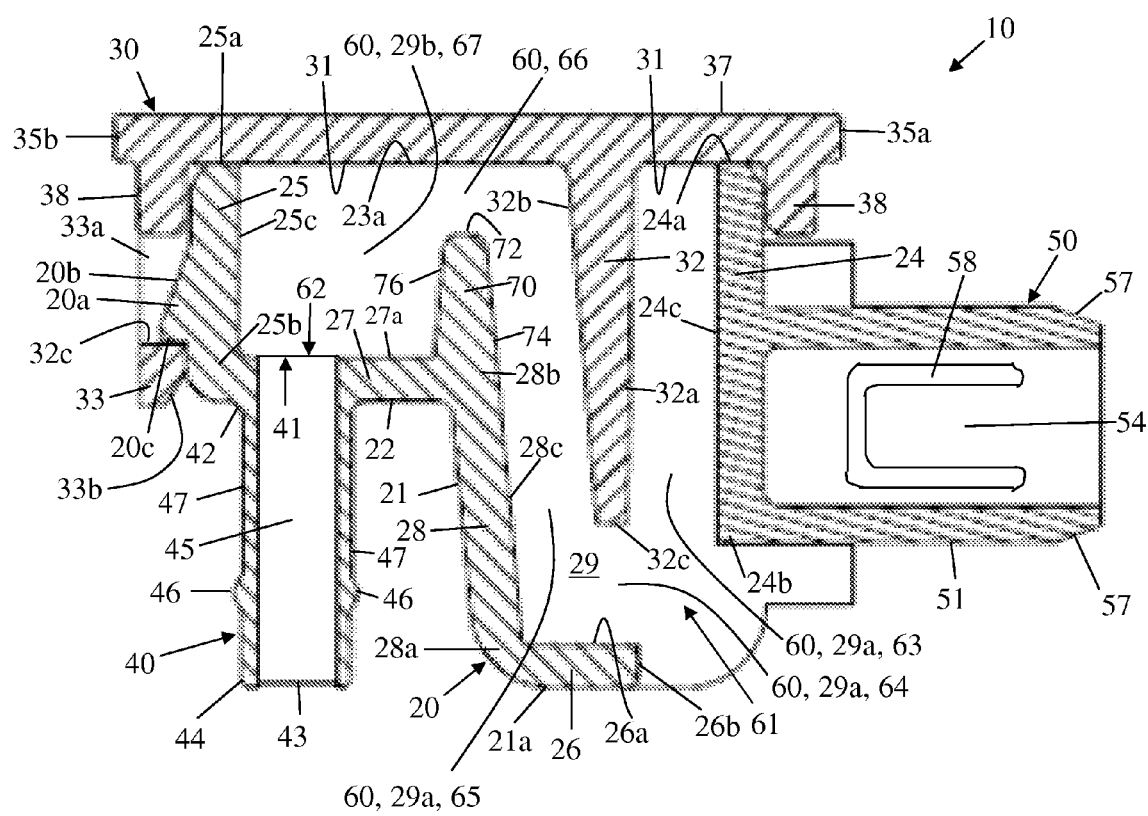
FIG. 3 is a cross-sectional view taken along line III-III of FIG. 1.

As viewed in FIG. 3, the cover 30 can cooperate with the housing 20 to define a maze-like chamber 60 having an inlet 61 adjacent the mounting member 50 and an outlet 62 in communication with the inlet 41 of the port 40. As will be discussed in further detail below, the maze-like chamber 60 can permit certain substance(s) entering the chamber inlet 61 to pass through to the outlet 62 and into the port inlet 41 and can prevent unwanted substance(s) from passing through to the port inlet 41.

Referring to FIGS. 2 and 3, the housing 20 can have a generally L-shape, with one leg 21 extending generally perpendicular to the other leg 22. The mounting member 50 can connect to and extend from the one housing leg 21 and the port 40 can connect to and extend from the other housing leg 22.

FIG. 3 shows the inlet 61 can be formed in the one housing leg 21 adjacent the one housing leg end surface 21a and adjacent to the mounting member 50. The chamber inlet 61 can be positioned adjacent to and possibly inward with respect to the mounting member 50. The chamber inlet 61 exposes a portion of the maze-like chamber 60 that is furthest from the port inlet 41. The chamber inlet 61 can be located adjacent the one housing leg surface 21a of the housing 20.

The port 40 can provide an outlet for fluid passing through the labyrinth box 10. Referring to FIGS. 2 and 3, the port 40 can be elongated and extend perpendicular to the other housing leg 22. The port 40 can also extend generally parallel to the one housing leg 21 and can and can be slightly angled to facilitate manufacture and molding of the product. The port 40 can be positioned on the other housing leg 22 closer to the end 22a of the other housing leg 22 than to the junction of the other housing leg 22 and the one housing leg 21.

With continuing reference to FIGS. 2 and 3, the port 40 can be cylindrical in shape with an outer diameter less than the length of the other leg 22 as measured perpendicular to the one leg 21. The port 40 can include an inlet 41 near the first end 42, an outlet 43 near the second end 44, and a passage 45 in communication with and extending from the inlet 41 to the outlet 43. The port 40 can further include a raised circumferential ridge 46 extending around its outer surface 47 near the port second end 44. The circumferential ridge 46 can be engaged by an inner surface of a conduit or sensor port/conduit (not shown) in an interference fit in a manner that is known in the art to secure a conduit to the port 40. The port second end 44 can be positioned co-planar with the end 21a of the one housing leg 21.

Turning now to details of the housing 20, in FIGS. 2 and 3, the housing 20 can include two side walls 23. (Only one side wall 23 is visible in FIG. 2—the other side wall can be a mirror image of the side wall 23 illustrated in FIG. 2. The inside of the other side wall is viewable in FIG. 3.) The housing 20 can also include first and second parallel walls 24, 25, first and second perpendicular walls 26, 27 and an inclined wall 28. The first and second parallel walls 24, 25 can extend generally parallel to the port 40. The first and second perpendicular walls 26, 27 can extend generally perpendicular to the port 40. The inclined wall 28 can extend obliquely relative to the port 40.

The first parallel wall 24, the first perpendicular wall 26, and the inclined wall 28 can cooperate with the two side walls 23 to define the one housing leg 21. The second parallel wall 25 and the second perpendicular wall 27 can cooperate with the side walls 23 to define the other housing leg 22.

In FIG. 3, each of the walls 24, 25, 26, 27, 28 can extend between and connect to the two side walls 23 to define a cavity 29 that extends within each of the housing legs 21, 22. The maze-like chamber 60 can be formed within/by the cavity 29.

As evident from a comparison of FIGS. 1 and 3, the cavity 29 can have an opening (not numbered) that can be closed off by the inner surface 31 of the cover 30. Referring to FIG. 3, the side walls 23 and the first and second parallel walls 24, 25 can terminate at respective ends 23a, 24a, 25a that can abut the cover inner surface 31. These wall ends 23a, 24a, 25a can cooperate with one another to define the opening (not numbered) that can be closed off by the cover inner surface 31.

The first and second parallel walls 24, 25 can connect to opposite ends (not numbered) of the side walls 23. The first and second parallel walls 24, 25 can extend generally parallel to one another and generally perpendicular to the mounting member 50.

With reference to FIG. 3, the first parallel wall 24 can have a length that is less than the distance between the cover inner surface 31 and the inner surface 26a of the first perpendicular wall 26. Thus, the first parallel wall 24 can terminate at an other end 24b that can be positioned intermediate the cover inner surface 31 and the inner surface 26a of the first perpendicular wall 26. In particular, the other end 24b can be closer to the first perpendicular wall inner surface 26a than to the cover inner surface 31. The other end 24b can also be co-planar with the bottom surface 51 of the mounting member 50 located at the bottom of the mounting member 50, as oriented in FIG. 3.

FIG. 3 illustrates the second parallel wall 25 extending from the cover inner surface 31 to the second perpendicular wall 27. The second parallel wall 25 can have a length that is less than the length of the first parallel wall 24. As such, the other end 25b of the second parallel wall 25 can be at a position intermediate, in a y-axis direction, to the cover inner surface 31 and the other end 24b of the first parallel wall 24.

Further in FIGS. 2 and 3, the inclined wall 28 can connect to the side walls 23 at a position spaced from and intermediate, in an x-axis direction, from the first and second parallel walls 24, 25. The inclined wall 28 can be angled away from the first parallel wall 24 and toward the second parallel wall 25. The inclined wall 28 can extend obliquely relative to the first and second parallel walls 24, 25 and obliquely relative to the first and second perpendicular walls 26, 27. The inclined wall 28 can include a first end 28a connected to the first perpendicular wall 26 and a second end 28b connected to the second perpendicular wall 27. The length of the inclined wall 28 can be less than the length of the first parallel wall 24 and greater than the length of the second parallel wall 25.

With continued reference to FIG. 3, the first and second perpendicular walls 26, 27 can extend generally parallel to the mounting member 50. The first and second perpendicular walls 26, 27 can be spaced from one another and can extend generally parallel to one another.

The first perpendicular wall 26 can extend from the inclined wall first end 28a generally toward the first parallel wall 24 and away from the port 40. The first perpendicular wall 26 can extend generally parallel to the cover inner surface 31 and generally parallel to the bottom surface 51 of the mounting member 50. The first perpendicular wall 26 can include an inner surface 26a that extends generally parallel to the cover inner surface 31 and the bottom surface 51 of the mounting member 50. The length of the first perpendicular wall 26 can be less than the distance from the inclined wall inner surface 28c to the inner surface 24c of the first parallel wall 24. As such, the first perpendicular wall 26 can terminate at an end 26b that can be at a position intermediate the inner surface 28c of the inclined wall 28 and the inner surface 24c of the first parallel wall 24.

Figure 4:
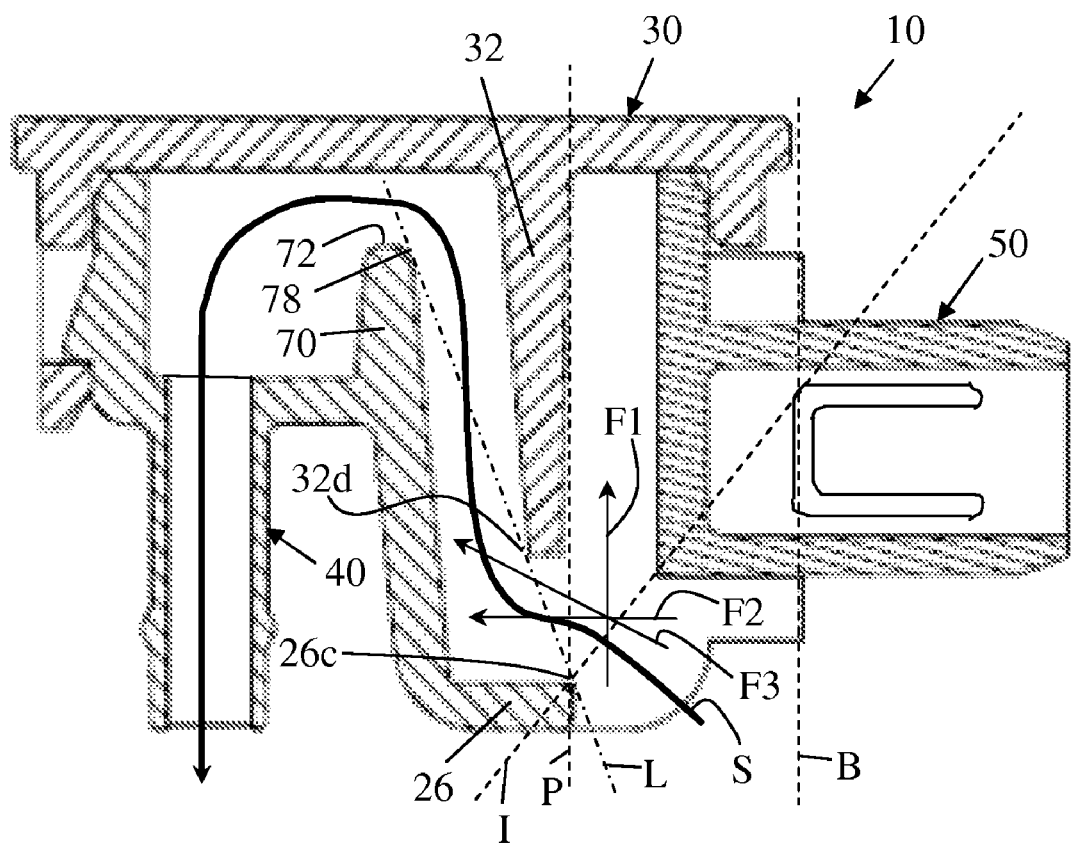
FIG. 4 is a similar cross-sectional view taken along line III-III of FIG. 1 showing geometric relationships between features of the labyrinth box and permissible and obstructed paths through the labyrinth box.
Figure 5A:
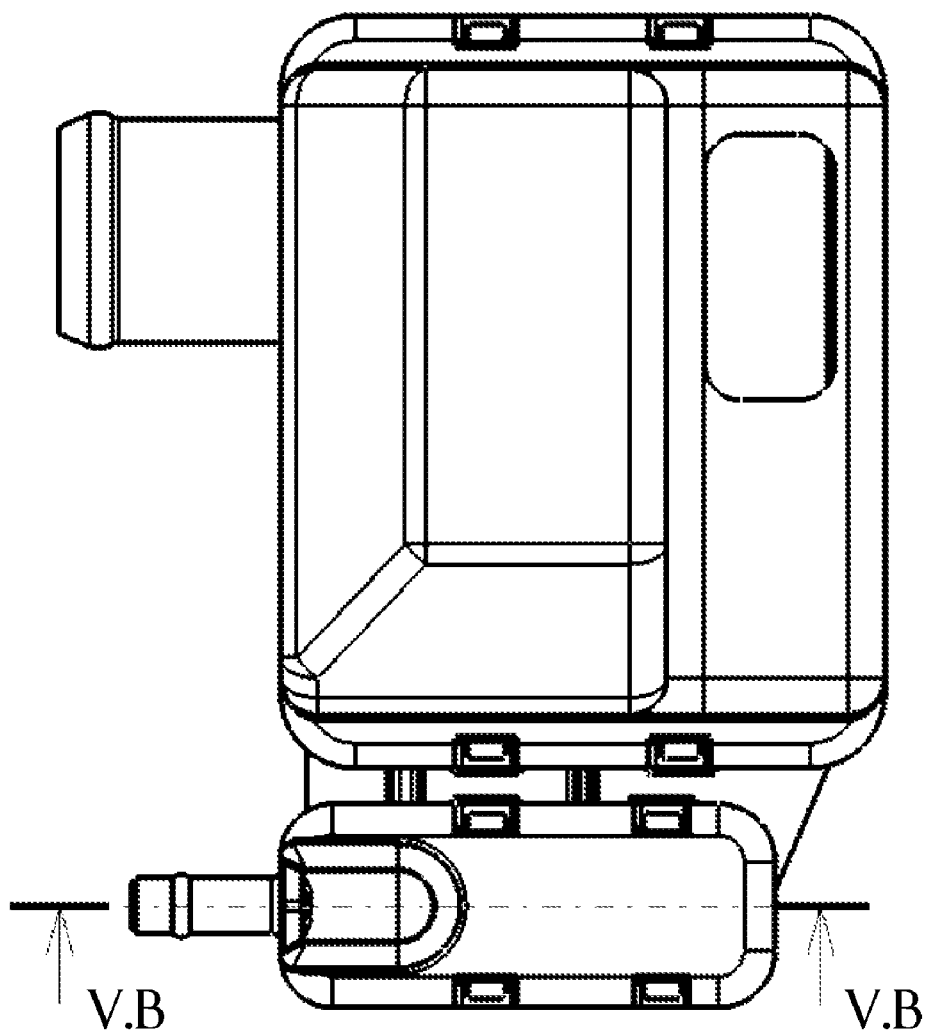
FIGS. 5A and B are an isometric and cross sectional view, respectively, of a conventional small joint arrangement configured to protect a port for a tank pressure sensor.
Figure 5B:
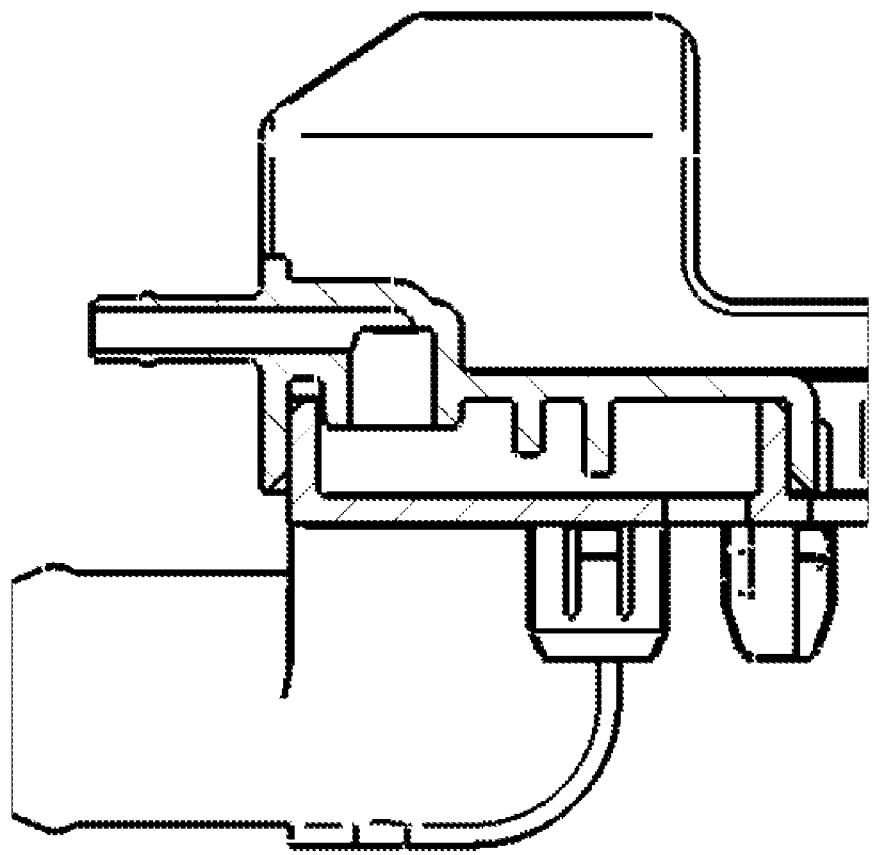
Figure 6A:
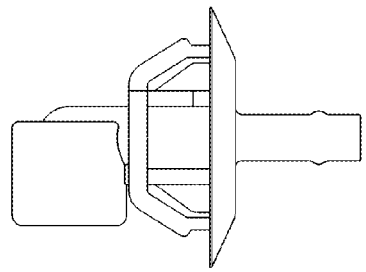
FIGS. 6A-C are a side, top, and cross-sectional view, respectively, of a conventional complex box arrangement configured to protect a port for a tank pressure sensor.
Figure 6B:
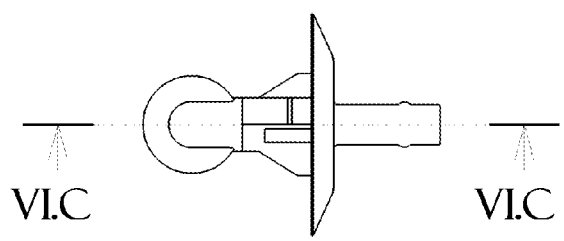
Figure 6C:
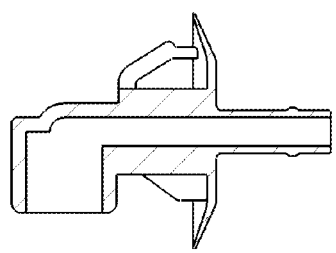

With reference to FIGS. 3 and 4, the end 26b of the first perpendicular wall 26 can cooperate with the other end 24b of the first parallel wall 24 and the two side walls 23 to define the chamber inlet 61. Specifically, the chamber inlet 61 can lie in a plane I (FIG. 4) that contains the junction of the inner surface 26a and the end 26b of the first perpendicular wall 26 and the junction of the inner surface 24c and the other end 24b of the first parallel wall 24. The inlet plane I extends at an obtuse angle relative to a plane B that represents a surface against which the labyrinth box can be mounted. The inlet plane I can also extend at an oblique angle with respect to the first and second parallel walls 24, 25, the first and second perpendicular walls 26, 27, and the inclined wall 28.

In FIG. 3, the second perpendicular wall 27 can extend from the other end 25b of the second parallel wall 25 to the other end 28b of the inclined wall 28. The chamber outlet 62 can extend through the second perpendicular wall 27 at a position near the second parallel wall 25. In particular, the chamber outlet 62 can be closer to the junction of the second perpendicular wall 27 and the second parallel wall 25 than it is to the junction of the second perpendicular wall 27 and the inclined wall 28. The port 40 can extend from the second perpendicular wall 27 coaxially with the chamber outlet 62. The second perpendicular wall 27 can extend at a position intermediate the cover inner surface 31 and the inner surface 26a of the first perpendicular wall 26. The second perpendicular wall 27 can also extend at a position intermediate the cover inner surface 31 and the mounting member bottom surface 51.

As depicted in FIG. 3, the cavity 29 can be defined by the inner surface 24c of the first parallel wall 24, the cover inner surface 31, the inner surface 25c of the second parallel wall 25, the inner surface 27a of the second perpendicular wall 27, the inner surface 28c of the inclined wall 28 and the inner surface 26a of the first perpendicular wall 26, and the side walls 23.

A chamber division wall 70 can extend into the cavity 29 to divide the cavity 29 into two sections 29a, 29b. The chamber division wall 70 can extend from the junction of the second perpendicular wall 27 and the inclined wall 28 toward the cover inner surface 31. The chamber division wall 70 can terminate at an end 72 that can be spaced from the cover inner surface 31. The space or gap is set up to be large enough such that a water drop's surface tension will not allow the drop to stretch and block the passage way. The chamber wall end 72 can be arcuate, as is depicted in FIG. 3. The chamber division wall 70 can include first and second surfaces 74, 76 that can converge toward one another as they approach the chamber wall end 72. The first convergent surface 74 can be co-planar and continuous with the inclined wall inner surface 28c. The second convergent surface 76 can extend obliquely from the inner surface 27a of the second perpendicular wall 27 and can extend obliquely at a narrow angle relative to the port 40. Thus, the chamber division wall 70 can have a tapered cross-section that narrows from the junction of the second perpendicular wall 27 and the inclined wall 28 toward its end 72, as viewed in FIG. 3.

The first cavity section 29a can be generally elongated in a direction parallel to the port 40 and generally elongated in a direction perpendicular to the mounting member 50, as viewed in FIG. 3. The first cavity section 29a can be bounded by the inner surface 24c of the first parallel wall 24, the cover inner surface 31, the inclined wall inner surface 28c, and the inner surface 26a of the first perpendicular wall 26. The chamber inlet 61 can be in communication with the first cavity section 29a.

With continuing reference to FIG. 3, the cover 30 can include a divider 32 that can extend into the first cavity section 29a. The divider 32 can separate the first cavity section 29a into three chamber passages 63, 64, 65. These three passages 63, 64, 65 can be continuous with one another. The divider 32 can extend generally perpendicularly from the cover inner surface 31 toward the first perpendicular wall 26.

The divider 32 can extend substantially parallel with the longitudinal axis of the cavity section 29a and along a substantial portion of the longitudinal length of the cavity section 29a. The term substantial taking on its ordinary meaning of at least more than half.

The divider 32 can include two convergent surfaces 32a, 32b and an end 32c. The convergent surfaces 32a, 32b can extend obliquely from the cover inner surface 32 to the end 32c. The end 32c can be spaced from the inner surface 26a of the second perpendicular wall 26. The first convergent surface 32a can extend at a narrow oblique angle relative to the inner surface 24c of the first parallel wall 24 and at a narrow oblique angle relative to the port 40. The first convergent surface 32a can extend away from the inner surface 24c and toward the inclined wall inner surface 28c. The second convergent surface 32b can extend at a narrow oblique angle relative to the inner surface 24c of the first parallel wall 24 and at a narrow oblique angle relative to the port 40. The second convergent surface 32b can extend toward the inner surface 24c and away from the inclined wall inner surface 28c. Thus, the divider 32 can have a tapered cross-section that narrows as the divider 32 extends into the first chamber section 29a and toward the inner surface 26a of the first perpendicular wall 26, as viewed in FIG. 3.

The first chamber passage 63 can be in direct communication with the chamber inlet 61 and the second chamber passage 64. The first chamber passage 63 can extend generally parallel relative to the port 40 and can be elongated in a direction generally parallel to the port 40. The first chamber passage 63 can be in fluid communication with the chamber inlet 61 and the second chamber passage 64. The first chamber passage 63 can be bounded by the inner surface 24c of the first parallel wall 24, the cover inner surface 31, the first convergent surface 32a, the second chamber passage 64, the inner surface 26a of the first perpendicular wall 26, and the inlet 61. The first chamber passage 63 can be a dead end passage that terminates at the cover inner surface 31. The dead end passage can be configured such that fluid cannot escape therefrom and is trapped therein. Thus, any fluid that enters into the dead end passage typically exits the box structure back through the inlet 61.

The second chamber passage 64 can extend generally perpendicularly relative to the port 40. The second chamber passage 64 can extend between and can be in direct communication with the first chamber passage 63 and the third chamber passage 65. The second chamber passage 64 can be bounded by the first chamber passage 63, the divider end 32c, the third chamber passage 65, and the inner surface 26a of the first perpendicular wall 26.

The third chamber passage 65 can extend obliquely relative to the port 40, the first chamber passage 63 and the second chamber passage 64. The third chamber passage 65 can also extend between and be in direct communication with the second chamber passage 64 and a fourth chamber passage 66. The third chamber passage 65 can be bounded by the second chamber passage 64, the second convergent wall 32b, the cover inner surface 31, the fourth chamber passage 66, the inclined wall inner surface 28c, and the inner surface 26a of the first perpendicular wall 26.

The second cavity section 29b can be bounded by the cover inner surface 31, the inner surface 25c of the second parallel wall 25, the inner surface 27a of the second perpendicular wall 27, the second chamber wall convergent surface 76, and the chamber wall end 72. The second cavity section 29b can be in direct communication with the chamber outlet 62 and the first cavity section 29a.

As depicted in FIG. 3, the cross-sectional area of the second cavity section 29b can be less than approximately one-half of the cross-sectional area of the first cavity section 29a. The second cavity section 29b can have a width, as measured perpendicular to the elongate port 40, that can be approximately equal to the width of the first cavity section 29a, as measured perpendicular to the port 40. The second cavity section 29b can have a length, as measured parallel to the port 40, that can be less than approximately one-half of the length of the first cavity section 29a, as measured parallel to the port 40.

The second chamber section 29b can include fourth and fifth chamber passages 66, 67. The fourth chamber passage 66 can extend between and can be in direct communication with the third chamber passage 65 and the fifth chamber passage 67. The fourth chamber passage 66 can be bounded by the third chamber passage 65, the cover inner surface 31, the fifth chamber passage 67, and the chamber wall end 72.

The fifth chamber passage 67 can extend between and be in direct communication with the fourth chamber passage 66 and the chamber outlet 62. The fifth chamber passage 67 can be bounded by the fourth chamber passage 66, the cover inner surface 31, the inner surface 25c of the second parallel wall 25, the inner surface 27a of the second perpendicular wall 27, the chamber outlet 62, and the second convergent surface 76.

Thus, the chamber passages 63-67 can cooperate with each other to form the maze-like chamber 60. The labyrinth box 10 can be oriented such that at least two of the chamber passages 63-67 can be elongate in a y-axis vertical orientation. As such, a substance in the maze-like chamber 60 must overcome gravity in order to pass from the chamber inlet 61, through the maze-like chamber 60, and out the chamber outlet 62. Moreover, the path through the box 10 is indirect: a line that contacts two of the corners will intersect the wall preventing any straight intrusion into the innermost chamber (cavity 29b).

As shown in FIGS. 2-4, the first and third chamber passages 63, 65 are vertically oriented. Alternately, the labyrinth box 10 can be rotated to the right ninety degrees so that the second and fourth chamber passages 64, 66 are vertically y-axis oriented with the port 40 extending at a level above all of the chamber passages 63-67, except for a portion of the fifth chamber passage 67.

In order to overcome gravity, a sufficient pressure differential should exist between the inlet 61 and the port outlet 43 to cause a substance to flow through the vertically oriented portions of chamber passages 63-67. If the pressure differential is insufficient, any substance entering the chamber inlet 61 will not be able to flow upward through the vertically oriented ones of the chamber passages 63-67. Thus, undesired substance(s) can be prevented from traveling completely through maze-like chamber 60. The box 10 is designed so that even if the box is submerged, liquid shouldn't leak into the port at the exit. This can be achieved in one embodiment by having the lid cover 30 overlap the base portion by at least 1 mm in all areas. The overlap creates a liquid seal that traps all of the internal air and prevents liquid leakage at least in the short term.

The inlet 61 can be formed as a port that is defined by an inner perimeter made up the corner 26c (which represents the junction of the inner surface 26a with wall 26b) and also the intersection of the surface 24c with the surface 24b and 51 of the mounting member 50. As can be seen, the divider 32 can be seen through the inlet 61 and has a longitudinal axis that, if extended, intersects with inner surface 26a of the wall 26 in this embodiment.

For example, if the labyrinth box 10 were to be used in the environment of a vehicle fuel system, it may be desirable to permit atmospheric air to enter the chamber inlet 61, pass through the maze-like chamber 60, and then exit the chamber outlet 62 into the port 40. Also in such an environment, it may be desirable to prevent liquid water, oil, mud, dirt, etc. that may enter the chamber inlet 61 from passing through the maze-like chamber 60 and into the port inlet 41.

With reference to FIG. 4, the relative placement, configurations and dimensions of the housing walls 24, 25, 26, 27, 28, the divider 32, and the chamber division wall 70 can define a serpentine path S within the maze-like chamber 60 that can extend between the chamber inlet 61 and the chamber outlet 62.

In order to force a substance entering the labyrinth box to follow the serpentine path S, the first perpendicular wall 26, the divider 32, and the chamber division wall 70 can be configured and dimensioned to each have a corner that lies along a common line L. However, in another embodiment, the path can be indirect, such that a line that contacts two of the corners will intersect the wall preventing any straight intrusion into the innermost chamber. As FIG. 4 illustrates, line L represents the only straight line path that extends from the chamber inlet 61 to the fourth chamber passage 66. This straight line path has a width that is equal to the thickness of a line as represented by the line L. Thus, a substance should be of a size less than or equal to the thickness of a line in order to directly pass through the maze-like chamber 60 along the line L. As such, most unwanted substances, such as liquid water, oil, mud, dirt, etc. should follow the serpentine path S through the maze-like chamber 60 in order to reach the port inlet 41. However, as indicated above, the disclosed subject matter contemplates that the walls of the box 10 can be configured such that no straight line exists that would allow for transmission straight from the port inlet 61 to the innermost chamber (cavity 29b).

Moreover, the surrounding structures can be configured such that straight line path L does not exist, and only substances that pass through a path similar to the serpentine path S can enter chamber passage 66 and eventually reach port 40.

With reference to FIGS. 3 and 4, the line L can be defined by a corner 26c of the first perpendicular wall 26, a corner 32d of the divider 32, and a tangential point 78 on the chamber division wall 70. The corner 26c represents the junction of the inner surface 26a with wall 26b, and also represents the end 26c of the first perpendicular wall 26. The corner 32d represents the junction of the second convergent surface 32b and the end 32c of the divider 32. And, the tangential point 78 represents the arcuate junction of the inclined wall inner surface 28c and the arcuate chamber wall end 72.

FIG. 4 also illustrates several linear flow paths F1, F2, F3 that are blocked by the maze-like chamber 60 such that a substance that enters the chamber inlet 61 cannot travel to the port inlet 41 without a sufficient pressure differential between the chamber inlet 61 and the port outlet 43. Specifically, the divider 32 and the first perpendicular wall 26 can direct any substance that enters the inlet 61 in a direction parallel to arrow F1 away from the serpentine path S and into the dead end first chamber passage 63. The first perpendicular wall 26 extends beyond the junction of the first convergent surface 32a of the divider 32 with the end 32c of the divider 32. In other words, the first convergent surface 32a can be positioned to lie intermediate a plane P containing the inclined wall inner surface 28c and the end 26b of the first perpendicular wall 26. Described in another way, the end 26b can extend beyond the first convergent surface 32a of the divider 32 such that the plane P lies intermediate the first convergent surface 32a and the inner surface 24c of the first perpendicular wall 24. Thus, wall 26 effectively blocks direct access to the chambers 65 and 66 of the cavity 29 from substances outside the labyrinth box 10.

The remaining linear flow paths F2, F3 can be blocked by the inclined wall inner surface 28c. Thus, a substance that enters the chamber inlet 61 should follow the serpentine flow path S from the chamber inlet 61 to the port inlet 41 in order to exit through the port outlet 43 when the labyrinth box 10 is not completely submerged in the substance.

In the event that the labyrinth box 10 becomes partially submerged or pressure is great enough, the chambers 63-65 can hold a volume of at least 3 cc before the substance can spill into the port inlet 41. Of course, the labyrinth box 10 could be sized differently to allow a greater volume be held by chambers 63-65 depending on a particular application or intended working environment for a vehicle.

It should be noted that the surfaces of the box can be defined relative to the required fluid flow within the chambers that make up the labyrinth box. For example, most of the fluid that enters the box through inlet 61 and exits through outlet 62 takes two substantial turns during its journey. The first turn is around the divider 32, and the second turn is about a division wall 70. In this embodiment, most of a fluid that travels from a lower portion of chamber 65 (i.e., from a primary end of a second chamber defined by the divider 32) and located adjacent the inlet 61 will make a 180 degree turn around the division wall before reaching and traveling through the outlet 62.

Turning now to the structural details of the cover 30, the cover 30 can be removably secured to the housing 20 by a plurality of resilient tabs 33 that can extend from the cover 30 and engage a respective one of a plurality of locking tabs 20a that can be provided on the housing 20.

The top 30 can have six sides—a pair of parallel lateral sides 34a, 34b, a pair of parallel transverse sides 35a, 35b and a pair of convergent sides 36a, 36b. The lateral sides 34a, 34b can extend perpendicular to the transverse sides 35a, 35b and from respective ends of the front transverse side 35a. The convergent sides 36a, 36b can extend from respective ends of the lateral sides 34a, 34b to respective ends of the rear transverse side 35b at an oblique angle relative to the rear transverse side 35b and the lateral sides 34a, 34b.

Referring to FIGS. 1-3, the cover 30 can include the inner surface 31, the plurality of resilient tabs 33, a flat top surface 37, and a flange 38. Only one resilient tab 33 is viewable in FIGS. 1 and 3. Two resilient tabs 33 are viewable in FIG. 2. It is noted that the opposite side of the labyrinth box 10 not viewable in FIG. 2 can be configured as a mirror image of the side shown in FIG. 2. A third resilient tab 33 can be located on the side of the cover 30 that is not viewable in FIG. 2.

The flange 38 can have a polygonal shape like that of the cover 30 and can extend from the inner surface 31 at a position inward from the edge of the inner surface 31. The flange 38 can extend along the outer surfaces of the side walls 23 and the parallel walls 24, 25 at their respective ends 23a, 24a, 25a. Two of the resilient tabs 33 can extend from respective portions of the flange 38 that are parallel to the lateral sides 34a, 34b of the cover 30 and the third resilient tab 33 can extend from a portion of the flange 38 that is parallel to the rear transverse side 35b of the cover 30. Each of the resilient tabs 33 can be cantilevered to the flange 38 and can include a lock window 33a and a sloped surface 33b. Each lock window 33a can be positioned between the sloped surface 33b and the flange 38. Each lock window 33a can receive a respective one of the lock ramps 20a of the housing 20.

Referring to FIG. 3, each of the three lock ramps 20a can have a sloped surface 20b and an engagement surface 20c. As the cover 30 is placed onto the housing 20, the tab sloped surfaces 33b contact and slide along the respective sloped surfaces 20b of the lock ramps 20a. This interaction causes the resilient tabs 33 to deflect away from the housing 20 until the bottoms 33c of the windows 33a pass below the engagement surfaces 20c of the respective lock ramps 20a. Then, the resilient tabs 33 can snap back toward the housing 20 such that the bottoms 33c of the windows 33a contact the engagement surfaces 20c of the respective lock ramps 20a, thereby locking the cover 30 to the housing 20.

The structural details of the mounting member 50 will now be discussed with reference to FIGS. 1, 2 and 3. The mounting member 50 can extend from and be angled and/or substantially perpendicular to the one housing leg 21 along the first parallel wall 24. The mounting member 50 can extend generally parallel relative to the other housing leg 22 in a direction opposite to which the other housing leg portion 22 extends from the one housing leg 21. The mounting member 50 can be approximately centered on the one housing leg 21 and offset relative to the other housing leg 22. The mounting member 50 can be hollow, open at one end and approximately square in cross-section.

The mounting member 50 can include a pair of locking arms 52, 54 that extend into respective openings 56, 58 formed in opposite sides of the mounting member 50. One of the locking arms 52 and its respective opening 56 can be viewed in FIGS. 1 and 2 and the other locking arm 54 and its respective opening 58 can be viewed in FIG. 3. The locking arms 52, 54 can be generally co-planar with the respective openings 56, 58. Each of the locking arms 52, 54 is cantilevered at one end to the mounting member 50. The locking arms 52, 54 each include a ramp (only the ramp 59 of the locking arm 54 is illustrated in FIGS. 1 and 2). The ramps 59 can project outward beyond the openings 56, 58 and the respective sides of the mounting member 50.

The ramps 59 deflect the locking arms 52, 54 inwardly of the mounting member 50 as the mounting member 50 is inserted into an aperture (not shown) provided in a support structure (not shown—for example, a vehicle body panel or frame member) until the ramps 59 align with corresponding mating structure of the aperture (not shown). At which point, the locking arms 52, 54 snap back into their original position within the openings 56, 58 to secure the mounting member 50 within the aperture (not shown). The open end of the mounting member 50 can include a chamfer 57 to facilitate insertion into the aperture (not shown).

As illustrated in FIGS. 1-3, the mounting member 50 and the port 40 can be integrally formed with the housing 20. Alternatively, the mounting member 50 and the port 40 can be formed separately and secured to the housing 20 by any known method, such as, threaded fastener(s), retainer clip(s), interference fit, adhesive, and/or welding, etc.

Similarly, the divider wall 32 and the tabs 33 can be formed integrally with the cover 30. Alternatively, the divider wall 32 and the tabs 33 can be formed separately and secured to the cover 30 by any known method, such as, threaded fastener(s), retainer clip(s), interference fit, adhesive, and/or welding, etc.

The tapers of the chamber wall 74 and the divider 32 can facilitate the manufacturing process used to produce the main housing 20, such as molding, stamping, or machining.

The divider 32 and the chamber division wall 70, 74 can also be tapered so that unwanted debris and fluids that enter to the perpendicular chamber portion can drain out of the maze-like chamber 60 and exit through the inlet 61 if the labyrinth box 10 is oriented with the hollow port 40 extending generally horizontally and above the first through fourth chamber passages 63, 64, 65, 66 (rotated 90 degrees clockwise from the view shown in FIG. 3). In this orientation, the second and fourth chamber passages 64, 66 can extend generally vertically, the chamber passage 63 can extend generally horizontally, and the third channel passage 65 can extend generally at a narrow acute angle relative to horizontal. The second convergent surface 32b of the divider 32 and the second convergent surface 76 of the chamber division wall 70 can extend at a narrow acute angle relative to horizontal in this orientation. As such, gravity will assist draining water, oil, mud, dirt, etc. from the maze-like chamber 60 and out of the labyrinth box 10 via the chamber inlet 61.

The disclosed labyrinth box 10 can be used in a fuel system for a vehicle. Specifically, the labyrinth box 10 can be connected to a tank pressure sensor used to monitor evaporative emissions of fuel vapor in the fuel tank where it is desired to admit atmospheric air into the tank pressure sensor through the inlet 61 of the labyrinth box 10 and prevent other substances, such as water, oil, mud, and dirt from entering the tank pressure sensor via the inlet 61 of the labyrinth box 10.

The labyrinth box 10 can alternatively be used with other vehicle components where exposure to atmospheric air is desired and water and/or debris intrusion is unwanted, such as a breather for a vehicle differential. Further still, the labyrinth box 10 can be used in a system where fluid or other substance(s) flows under a controlled applied pressure such that the controlled pressure is sufficient to push certain substance(s) through the labyrinth box 10 and insufficient to push other substances through the labyrinth box 10.

While certain embodiments of the disclosed subject matter are described above, it should be understood that the disclosed subject matter can be embodied and configured in many different ways without departing from the spirit and scope of the disclosed subject matter. For example, the various walls of the housing 20 need not be perpendicular or parallel to the port 40. That is, the housing walls can extend at any oblique angle relative to the port 40 in order to accommodate packaging and/or other consideration(s) while maintaining a maze-like configuration for the chamber 60. The box 10 of FIG. 3 is merely one example of an application of the disclosed subject matter. Similarly, the side walls 23 and the sides 34a, 34b, 35a, 35b, 36a, 36b of the cover 30 can have other geometric configurations to meet packaging and/or other consideration(s).

The cover 30 and housing 20 are contemplated as single one piece plastic structures that are injection molded, blow molded, or otherwise constructed. However, it is possible that these components can be made from other materials and methods. For example, the cover 30 and housing 20 can be made from a metal material if the box is intended for a high heat environment or other application that requires the strength and/or heat requirements suited to metal materials. The port 40 can be a separate structure that is added or mounted to the housing 20. Likewise the mounting member 50 can also be a separate structure that is mounted to or added onto the housing after manufacture of each of the components.

A method of using the box can include mounting the box such that the top surface of the cover 30 is located in a substantially horizontal relationship to ground. The method can also include mounting the box such that the cover is vertically oriented with respect to ground and such that the divider is oriented substantially horizontally with respect to ground. In this orientation, the slight downward slope of the divider surface 32b allows fluids to drain back towards the inlet 61 due to action of gravity.

A method of the disclosed subject matter can include providing various of the structures described above and shown in the drawings, and then causing fluid to enter both a dead end passageway and a circuitous throughway passageway to prevent the fluid from entering a port.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A labyrinth box comprising:
a single unitary piece housing structure having an open end spaced from a substantially closed end by at least one side wall, the housing structure defining a first cavity having a first longitudinal length extending from the substantially closed end to the open end of the housing structure and a second cavity having a depth extending substantially parallel with the longitudinal length of the first cavity and from the substantially closed end to the open end of the housing structure, the housing structure having an inlet port located at the substantially closed end of the first cavity and an outlet port located in the second cavity; and
a cover located adjacent and sealing the open end of the housing structure, the cover including an inner surface facing the housing structure, the cover further including a divider extending from the inner surface of the cover into the first cavity of the housing structure to divide the first cavity into a first chamber and a second chamber, the divider extending along a substantial portion of the longitudinal length of the first cavity such that a longitudinal axis of the first chamber and a longitudinal axis of the second chamber are each substantially parallel with the longitudinal axis of the first cavity, wherein
the housing structure is configured such that the second cavity forms a third chamber that is in fluid communication with the second chamber at a location opposed to the inlet port and closer to the cover than the inlet port, and the divider extending from the inner surface of the cover into the first cavity includes at least one surface that is positioned at an angle with respect to the longitudinal axis of the first chamber such that when the box is oriented in a configuration in which the cover extends vertically and the longitudinal axis of the first chamber extends horizontally, fluid will drain off of the divider due to the action of gravity and the angle of the divider surface.

2. The labyrinth box of claim 1, wherein the housing structure and cover are configured such that the first chamber forms a dead end closure adjacent the cover and is open to the inlet port at a location opposed to the dead end closure.

3. The labyrinth box of claim 1, wherein the inlet port is exposed to atmospheric pressure and the outlet port is configured for attachment to a fuel tank pressure sensor structure.

4. The labyrinth box of claim 1, wherein the outlet port is located in the closed end of the housing structure.

5. The labyrinth box of claim 4, wherein the outlet port includes a tubular structure extending from the closed end of the housing structure.

6. The labyrinth box of claim 1, wherein the cover inner surface extends substantially perpendicular to the divider, and the closed end of the housing structure that defines the first cavity includes a bottom surface portion that extends substantially parallel with the cover inner surface, the bottom surface portion that extends substantially parallel also terminates at a location defining an inner perimeter of the inlet port.

7. The labyrinth box of claim 6, wherein the side wall of the housing structure includes a first cavity side surface located adjacent to the bottom surface portion, the first cavity side surface extending substantially perpendicular to the cover inner surface and combining with the bottom surface portion to define the inner perimeter of the inlet port.

8. A labyrinth box comprising:
an inlet port;
an outlet port;
a plurality of first surfaces located adjacent the inlet port and defining a first chamber that extends along a first chamber longitudinal axis from a first chamber primary end located adjacent the inlet port to a first chamber distal end spaced from the inlet port and sealed by an end surface to form a dead end;
a plurality of second surfaces located adjacent the inlet port and defining a second chamber that extends along a second chamber longitudinal axis from a second chamber primary end located adjacent the inlet port to a second chamber distal end spaced from the inlet port and in fluid communication with a third chamber;
a plurality of third surfaces located adjacent the plurality of second surfaces and defining the third chamber, the third chamber located adjacent at least a portion of the second chamber and the outlet port defined by at least one of the plurality of third surfaces in the third chamber, the plurality of second surfaces and the plurality of third surfaces being configured such that fluid that enters the outlet port via the third chamber and second chamber must turn at least 90 degrees with respect to the longitudinal axis of the second chamber during travel from the second chamber primary end to the outlet port, wherein the divider structure includes at least one surface that is positioned at an angle with respect to the first chamber longitudinal axis and toward the inlet port such that when the box is oriented in a configuration in which the first chamber longitudinal axis is horizontally oriented, fluid will drain off of the divider structure due to the action of gravity and the angle of the divider structure surface.

9. The labyrinth box of claim 8, wherein the plurality of second surfaces and the plurality of third surfaces share a common division wall such that a first surface of the division wall forms one of the plurality of second surfaces that define the second chamber and a second surface of the division wall is substantially opposed to the first surface of the division wall and forms one of the plurality of third surfaces that define the third chamber, the first surface of the division wall extending substantially parallel with the second surface of the division wall.

10. The labyrinth box of claim 8, wherein the plurality of third surfaces form a third chamber inlet located adjacent the second chamber distal end, and the outlet port is located in the third chamber at a position opposed to the third chamber inlet such that fluid must turn at least ninety degrees as it passes from the second chamber primary end via the second chamber distal end and third chamber inlet to the outlet port.

11. The labyrinth box of claim 8, wherein the outlet port includes a tubular structure extending from at least one of the plurality of third surface that define the third chamber.

12. The labyrinth box of claim 8, wherein the second chamber longitudinal axis is substantially parallel with the first chamber longitudinal axis.

13. The labyrinth box of claim 8, wherein the plurality of first surfaces and the plurality of second surfaces share a common wall divider structure that extends from the first chamber distal end and the second chamber distal end towards the inlet port along a substantial length of the first chamber and second chamber.

14. The labyrinth box of claim 13, wherein the plurality of second surfaces and the plurality of third surfaces share a common division wall.

15. The labyrinth box of claim 14, wherein the divider and the division wall extend substantially parallel with each other.

16. The labyrinth box of claim 13, wherein the divider structure includes a longitudinal central axis and the plurality of second surfaces that define the second chamber includes a second inlet defining surface that is oriented substantially perpendicular to the longitudinal central axis of the divider structure, and wherein the longitudinal central axis of the divider structure intersects the second inlet defining surface and the second inlet defining surface defines an inner perimeter of the inlet port.

17. A labyrinth box comprising:
a first housing member including a plurality of first inner surfaces extending along different planes, the first inner surfaces defining a cavity and an opening extending across a portion of the cavity;
a second housing member having a plurality of second inner surfaces extending along different planes, one of the second inner surfaces extending across the opening of the first housing member to close the opening, the second surfaces cooperating with the first surfaces to define a circuitous passageway;
an inlet located at a first position in the circuitous passageway;
an outlet located at a second position in the passageway, wherein the passageway includes at least one dead end branch that extends from the inlet and terminates at a location spaced from the inlet such that fluid cannot pass through the dead end branch, and the passageway includes a throughway branch that extends from the inlet to the outlet, and the throughway branch being circuitous and configured such that fluid can pass through the throughway branch via and a divider structure extending into the cavity of the first housing member to define two adjacent passageway portions on either side of the divider structure, a first of the adjacent passageway portions being the dead end branch, the divider structure including an upper surface and an opposed lower surface, the upper surface being positioned at an angle greater than zero with respect to the lower surface and extending toward the inlet such that when the box is oriented in a configuration in which the divider structure is horizontally oriented, fluid will drain off of the divider structure due to the action of gravity and the angle of the divider structure surface.

18. The labyrinth box of claim 17, wherein the inlet is exposed to atmospheric pressure and the outlet is configured for connection to a fuel tank pressure sensor structure.

19. The labyrinth box of claim 17, wherein the second housing member includes a cover portion and the divider structure extends along a divider longitudinal axis substantially perpendicularly from the cover portion.

20. The labyrinth box of claim 19, wherein the first inner surfaces of the first housing member includes a bottom surface portion extending substantially perpendicular to the divider longitudinal axis and intersecting with the divider longitudinal axis while being spaced from the divider structure, the bottom surface portion terminates at a location to define an inner perimeter of the inlet.

21. The labyrinth box of claim 17, wherein the first housing member includes a mounting member wall that extends from the first housing member in a substantially perpendicular manner with respect to a longitudinal axis of the dead end branch of the circuitous passageway, and an outside surface of the mounting member wall intersects with at least one of the plurality of first inner surface walls to form a portion of an inner perimeter of the inlet.

* * * * *